(12) United States Patent
Ito et al.

(10) Patent No.: US 11,254,191 B2
(45) Date of Patent: Feb. 22, 2022

(54) AIR CONDITIONING REGISTER

(71) Applicant: TOYODA GOSEI CO., LTD., Kiyosu (JP)

(72) Inventors: Kenichi Ito, Kiyosu (JP); Tatsuya Tanikawa, Kiyosu (JP); Yasuyuki Mitsui, Kiyosu (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 0 days.

(21) Appl. No.: 16/925,734

(22) Filed: Jul. 10, 2020

(65) Prior Publication Data
US 2021/0016636 A1    Jan. 21, 2021

(30) Foreign Application Priority Data
Jul. 16, 2019    (JP) .............................. JP2019-130917

(51) Int. Cl.
*B60H 1/34* (2006.01)

(52) U.S. Cl.
CPC ... *B60H 1/3421* (2013.01); *B60H 2001/3471* (2013.01)

(58) Field of Classification Search
CPC .. B60H 1/3421; B60H 1/3428; B60H 1/3435; B60H 2001/3471
See application file for complete search history.

(56) References Cited

U.S. PATENT DOCUMENTS

2015/0328959 A1* 11/2015 Suzuki .................. F24F 13/15
454/155

FOREIGN PATENT DOCUMENTS

| DE | 10 2008 059 736 A1 | 7/2009 |
|---|---|---|
| JP | 2012-179932 A | 9/2012 |
| JP | 2013-154769 A | 8/2013 |
| JP | 2015-218913 A | 12/2015 |

* cited by examiner

*Primary Examiner* — Steven S Anderson, II
(74) *Attorney, Agent, or Firm* — Posz Law Group, PLC

(57) ABSTRACT

An air conditioning register includes: a downstream side fin; an upstream side fin; an operation knob; and a fork including a pair of transmission pieces, and connected to the operation knob. A transmission shaft is provided in the upstream side fin, and is interposed between the pair of transmission pieces. The transmission shaft is provided with a stopper that regulates further displacement of the fork. A surface of the stopper is an inclined surface that is inclined with respect to a center axis of the transmission shaft so as to be located outside in a radial direction centering on the center axis of the transmission shaft as approaching an end of the transmission shaft. An inclination angle of the inclined surface with respect to the center axis of the transmission shaft is an angle equal to or greater than 9° and equal to or less than 14°.

3 Claims, 8 Drawing Sheets

UPSTREAM SIDE ← → DOWNSTREAM SIDE

AIR CONDITIONING REGISTER

CROSS-REFERENCE TO RELATED APPLICATION(S)

This application is based upon and claims the benefit of priority from prior Japanese patent application No. 2019-130917 filed on Jul. 16, 2019, the entire contents of which are incorporated herein by reference.

BACKGROUND

1. Field of the Invention

The present invention relates to an air conditioning register in which a fin is provided in a ventilation path for air-conditioning air.

2. Description of the Related Art

JP-A-2015-218913 describes an example of an air conditioning register. This air conditioning register includes a downstream side fin and an upstream side fin disposed upstream of the downstream side fin in a flow direction of air-conditioning air. An extending direction of the downstream side fin is almost orthogonal to an extending direction of the upstream side fin. A transmission shaft is provided in the upstream side fin.

The downstream side fin supports an operation knob rotating together with the downstream side fin. A fork is connected to the operation knob, and the fork includes a pair of transmission pieces for sandwiching the transmission shaft therebetween. A pair of stoppers that are disposed to be separated from each other in the extending direction are provided in the transmission shaft. Then, at least one of the pair of transmission pieces is caused to contact the stopper by displacement of the fork caused by an operation of the operation knob by a user, thereby making it possible to regulate further displacement of the operation knob, that is, further rotation of the downstream side fin.

When a transmission piece of a fork contacts a stopper by displacement of the fork caused by an operation of an operation knob by a user an abnormal noise is generated by the contact therebetween. When the abnormal noise is large at this time, the user may feel uncomfortable.

SUMMARY

An object of the present invention is to prevent the generation of abnormal noise when the fork contacts the stopper.

According to an aspect of the invention, there is provided an air conditioning register including: a downstream side fin that extends in a first direction which is a direction intersecting a flow direction of air-conditioning air and that is configured to be rotatable around an axis extending in the first direction; an upstream side fin that is disposed upstream of the downstream side fin in the flow direction and that extends in a second direction which is a direction intersecting both the flow direction and the first direction; an operation knob supported by the downstream side fin so as to rotate together with the downstream side fin; and a fork that includes a pair of transmission pieces separated from each other in the first direction, and that is connected to the operation knob, wherein: a transmission shaft extending in a direction intersecting the first direction is provided in the upstream side fin, and the transmission shaft is interposed between the pair of transmission pieces in the first direction; the transmission shaft is provided with a stopper that regulates further displacement of the fork, when at least one of the pair of transmission pieces contacts the stopper by the displacement of the fork caused by the rotation of the operation knob and the downstream side fin; a surface of the stopper contacting the transmission piece is an inclined surface that is inclined with respect to a center axis of the transmission shaft so as to be located outside in a radial direction centering on the center axis of the transmission shaft as approaching an end of the transmission shaft; and an inclination angle of the inclined surface with respect to the center axis of the transmission shaft is an angle equal to or greater than 9° and equal to or less than 14°.

When the inclination angle of the inclined surface with respect to the center axis of the transmission shaft is less than "9°", there is a possibility that the displacement of the fork cannot be regulated by the stopper because the thickness of the stopper is not thick enough with respect to a distance between the pair of transmission pieces. In this point, according to the above-described configuration, the inclination angle is the angle equal to or greater than "9°". Therefore, the displacement of the fork can be regulated by causing the transmission piece to contact the stopper by the rotation of the operation knob. That is, it is possible to regulate the rotation of the operation knob and the downstream side fin connected to the fork.

On the other hand, as the inclination angle is greater, an abnormal noise generated when the transmission piece contacts the stopper is easy to become large. Therefore, as a result of repeating various experiments regarding a relationship between the inclination angle and magnitude of the abnormal noise, the inventor of the present invention finds out that a user cannot hear the abnormal noise generated when the transmission piece contacts the stopper or the user does not feel uncomfortable with respect to the generation of the abnormal noise by setting the inclination angle to be equal to or less than "14°".

In the above-described configuration, the inclination angle is the angle equal to or greater than "9°" and equal to or less than "14°". Therefore, by causing the transmission piece to contact the stopper, further rotation of the operation knob and the downstream side fin is regulated, and the generation of abnormal noise caused by the contact between the transmission piece and the stopper is prevented.

In the air conditioning register according to the aspect of the invention, the stopper may be configured so that a diameter thereof gradually increases as the stopper approaches the end of the transmission shaft.

Further, in the air conditioning register according to the aspect of the invention, a center axis of the stopper may be inclined with respect to the center axis of the transmission shaft so that an inclination angle of the inclined surface at a portion on the upstream side in the flow direction of the stopper is greater than an inclination angle of the inclined surface at a portion on the downstream side in the flow direction of the stopper, a base end of the fork may be supported in a rotatable state with respect to the operation knob, when the fork does not contact the stopper, the fork may be displaced in a state where an angle formed by the operation knob and the fork is maintained when the operation knob is rotated, when the fork approaches the stopper and the transmission piece contacts the portion on the upstream side in the flow direction of the stopper, the angle formed by the operation knob and the fork may be changed by further rotation of the operation knob, and a contact portion between the stopper and the transmission piece may be displaced to the downstream side in the flow direction, and when the transmission piece contacts the portion on the upstream side in the flow direction of the stopper and the displacement of the fork is regulated by the stopper, the further rotation of the operation knob may be regulated.

According to the above-described configuration, when the transmission piece of the fork contacts the portion on the upstream side in the flow direction of the stopper by the displacement of the fork caused by the rotation of the operation knob, the angle formed by the operation knob and the fork is changed according to the further rotation of the operation knob, and the contact portion between the stopper and the transmission piece is displaced to the downstream side in the flow direction. Then, when the transmission piece contacts the portion on the downstream side in the flow direction of the stopper, and the displacement of the fork is regulated by the stopper, the rotation of the operation knob is regulated.

When the operation knob is rotated in a direction of causing the transmission piece to approach the stopper in a state where the angle formed by the operation knob and the fork is maintained, tips of the pair of transmission pieces may be displaced to the downstream side in the flow direction. At this time, in a case where a length of the pair of transmission pieces is short, when the transmission piece is caused to approach the stopper and the transmission piece is caused to contact the portion on the upstream side in the flow direction of the stopper, the transmission shaft may be detached to the outside from a space between the tips of the pair of transmission pieces.

In this point, according to the above-described configuration, the center axis of the stopper is inclined with respect to the center axis of the transmission shaft so that the inclination angle of the inclined surface at the portion on the upstream side in the flow direction of the stopper is greater than the inclination angle of the inclined surface at the portion on the downstream side in the flow direction of the stopper. Accordingly, the inclined surface at the portion on the upstream side in the flow direction can be disposed closer to the center side in the extending direction of the transmission shaft than the inclined surface at the portion on the downstream side in the flow direction. As a result, when the pair of transmission pieces are caused to approach the stopper by the rotation of the operation knob, the transmission piece can be caused to contact the stopper before the transmission shaft is detached to the outside from the space between the tips of the pair of transmission pieces. That is, it is possible to prevent the transmission shaft from being detached from the space between the pair of transmission pieces.

According to the above-described air conditioning register, it is possible to prevent generation of an abnormal noise when a fork contacts a stopper.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Hereinafter, a first embodiment of an air conditioning register will be described with reference to FIGS. 1 to 7.

Figure 1:
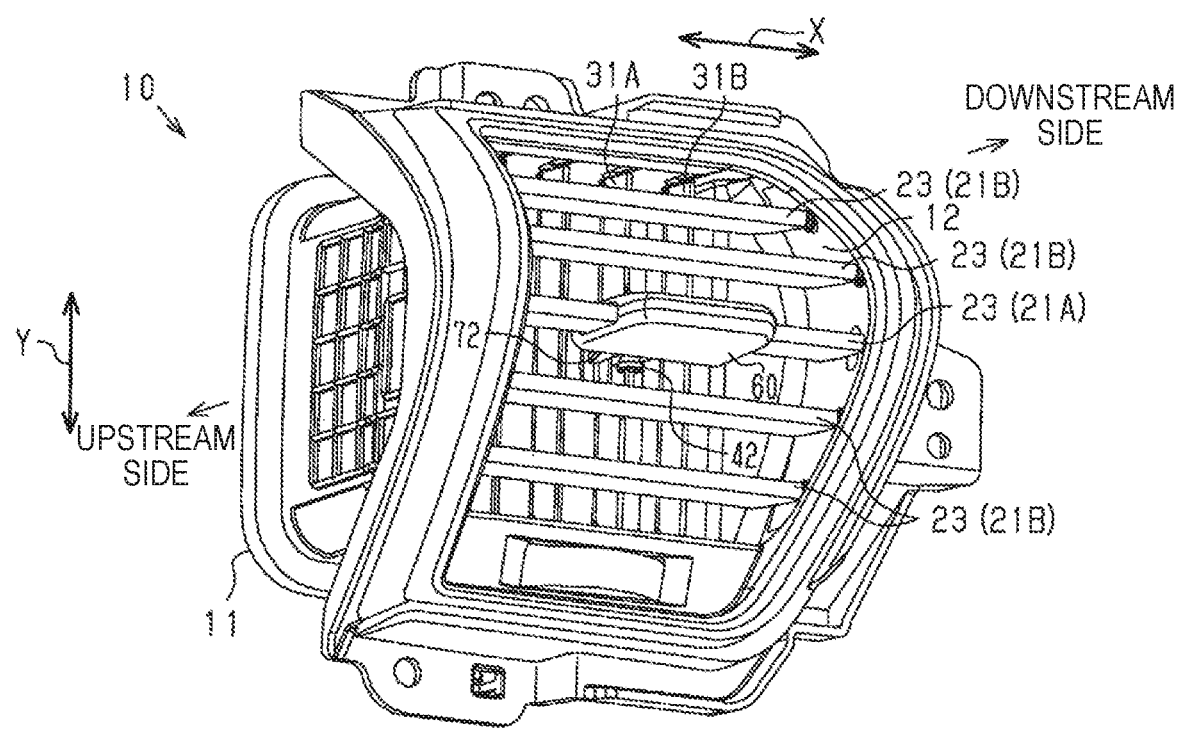
FIG. 1 is a perspective view illustrating an air conditioning register of a first embodiment.
Figure 2:
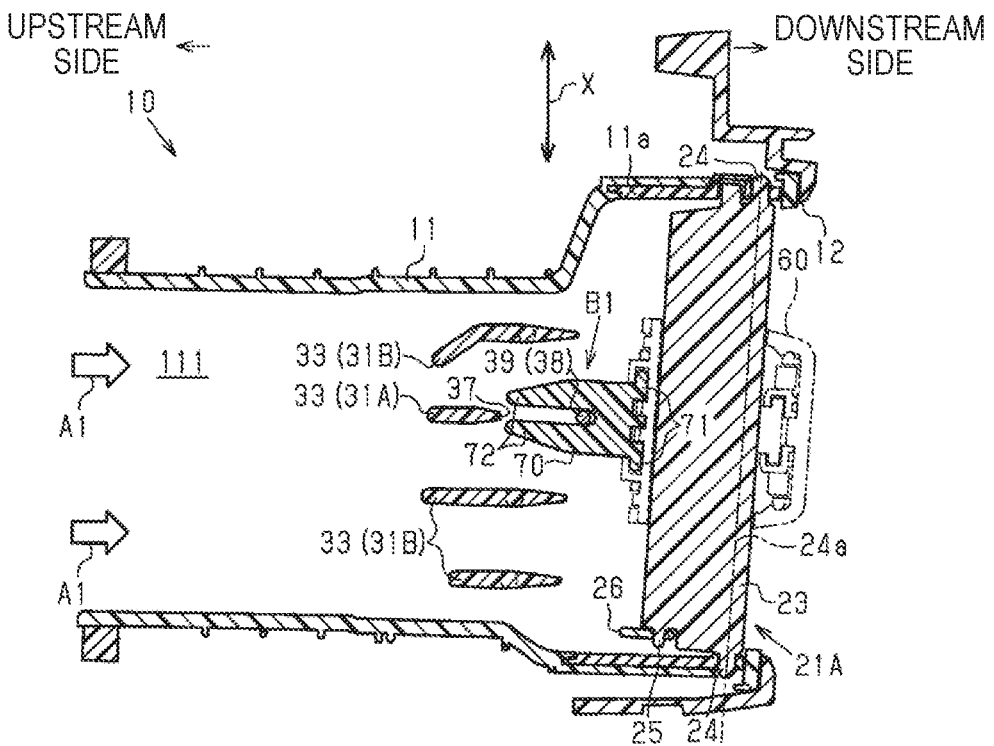
FIG. 2 is an end view of the air conditioning register.

FIG. 1 illustrates an air conditioning register 10 provided in an on-vehicle air conditioner. For example, the air conditioning register 10 is incorporated in both side parts or a center part in a vehicle width direction X of an instrument panel of a vehicle. As illustrated in FIGS. 1 and 2, the air conditioning register 10 includes a retainer 11 having a cylindrical shape. A ventilation path 111 through which air-conditioning air sent from the air conditioner flows is formed inside the retainer 11. A direction in which the air-conditioning air flows in the ventilation path 111 is referred to as a "flow direction A1". In the flow direction A1, aside close to the air conditioner is defined as an upstream side, and a side farther from the air conditioner is defined as a downstream side. Then, the air-conditioning air flowing through the ventilation path 111 is blown out into a vehicle compartment through an air outlet 12 located at a downstream end in the flow direction A1.

The ventilation path 111 is provided with a plurality of downstream side fins 21A and 21B and a plurality of upstream side fins 31A and 31B disposed upstream of the respective downstream side fins 21A and 21B in the flow direction A1. The respective downstream side fins 21A and 21B include: a plate-shaped downstream side main body part 23 extending in the vehicle width direction X which is a direction intersecting the flow direction A1; and a pair of downstream side fin shaft parts 24 protruding from both ends in the vehicle width direction X of the downstream side main body part 23. In the embodiment, the vehicle width direction X corresponds to a "first direction". The plurality of downstream side fins 21A and 21B are disposed in a state of being separated from each other in a direction intersecting both the flow direction A1 and the vehicle width direction X. In order to distinguish the plurality of downstream side fins 21A and 21B from each other, the one located at a center part in a vehicle vertical direction Y is referred to as the "downstream side fin 21A", and the other one is referred to as the "downstream side fin 21B".

Both the downstream side fin shaft parts 24 are supported by a side wall 11a of the retainer 11 in a rotatable state. An axis extending in an extending direction of the downstream side main body part 23 and passing through both the downstream side fin shaft parts 24 is referred to as a "rotation axis 24a of the downstream side fins 21A and 21B". The respective downstream side fins 21A and 21B are rotatable around the rotation axis 24a.

In each downstream side main body part 23, a connection shaft 25 is provided at a place that deviates from one downstream side fin shaft part 24 in the vehicle width direction X to the upstream in the flow direction A1. The connection shaft 25 of the respective downstream side fins 21A and 21B is connected by a connection rod 26 extending in a direction in which the respective downstream side fins 21A and 21B are arranged. Therefore, since the connection rod 26 is displaced in a direction corresponding to a rotation direction of the downstream side fin 21A when the downstream side fin 21A is rotated, the other downstream side fin 21B also rotates in association with the rotation of the downstream side fin 21A.

Figure 3:
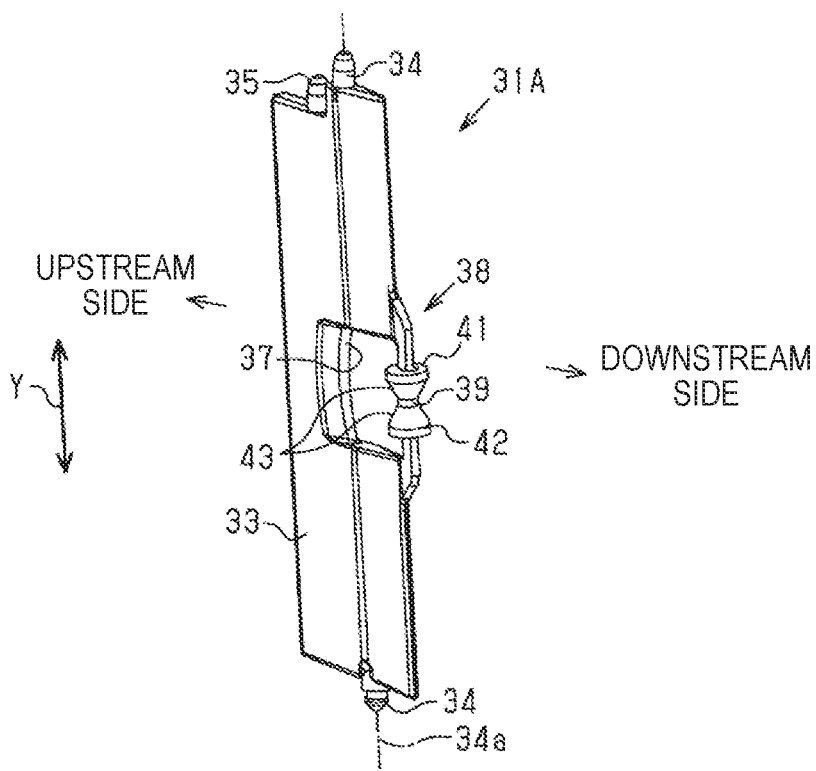
FIG. 3 is a perspective view illustrating an upstream side fin of the air conditioning register.

As illustrated in FIGS. 2 and 3, the respective upstream side fins 31A and 31B include: a plate-shaped upstream side main body part 33 extending in the vehicle vertical direction Y, which is an example of a direction intersecting both the flow direction A1 and the vehicle width direction X; and a pair of upstream side fin shaft parts 34 protruding from both ends in the vehicle vertical direction Y of the upstream side main body part 33. In the embodiment, the vehicle vertical direction Y corresponds to a "second direction". The plurality of upstream side fins 31A and 31B are disposed in a state of being separated from each other in a direction intersecting both the flow direction A1 and the vehicle vertical direction Y. In order to distinguish the plurality of upstream side fins 31A and 31B from each other, the one located in a middle part in the vehicle width direction X is referred to as the "upstream side fin 31A", and the other one is referred to as the "upstream side fin 31B".

Figure 5A:
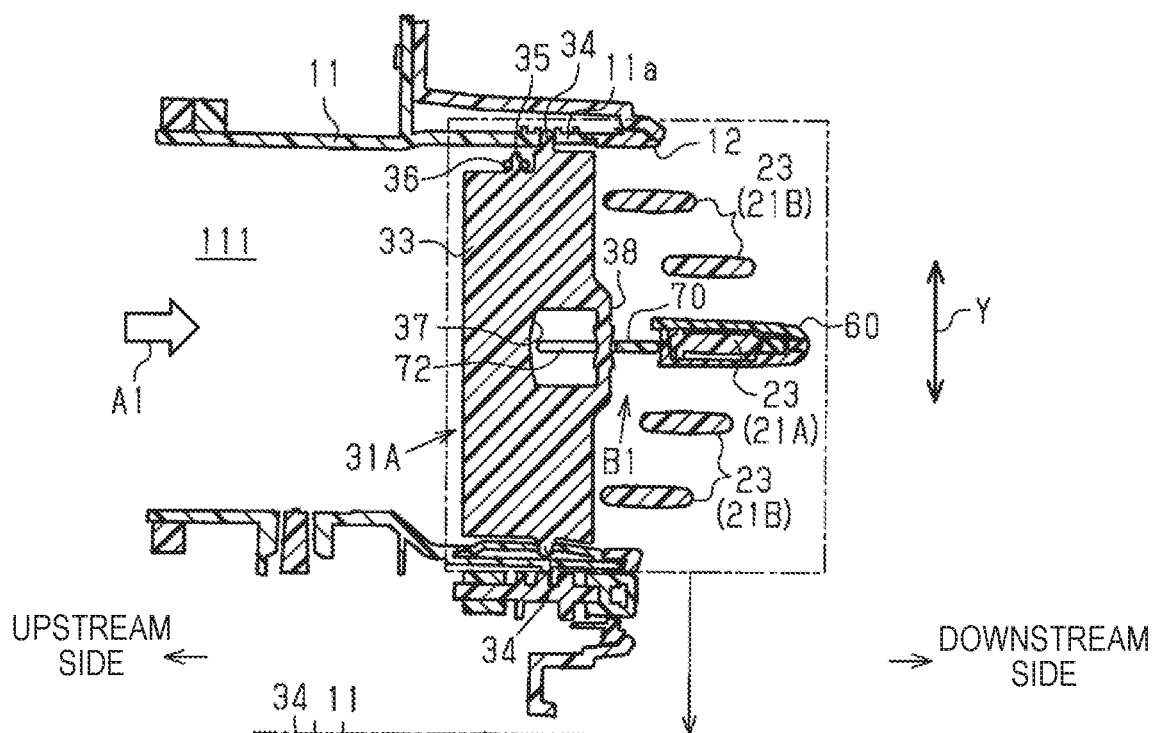
FIG. 5A is an end view of the air conditioning register.

As illustrated in FIGS. 3 and 5A, both the upstream side fin shaft parts 34 are supported by the side wall 11a of the retainer 11 in a rotatable state. An axis extending in an extending direction of the upstream side main body part 33 and passing through both the upstream side fin shaft parts 34 is referred to as a "rotation axis 34a of the upstream side fins 31A and 31B". The respective upstream side fins 31A and 31B are rotatable around the rotation axis 34a.

In each upstream side main body part 33, a connection shaft 35 is provided at a place that deviates from one upstream side fin shaft part 34 to the upstream in the flow direction A1. The connection shaft 35 of the respective upstream side fins 31A and 31B is connected by a connection rod 36 extending in a direction in which the respective upstream side fins 31A and 31B are arranged. Therefore, since the connection rod 36 is displaced in a direction corresponding to a rotation direction of the upstream side fin 31A when the upstream side fin 31A is rotated, the other upstream side fin 31B also rotates in association with the rotation of the upstream side fin 31A.

As illustrated in FIGS. 1 and 2, the air conditioning register 10 includes an operation knob 60 supported by the downstream side fin 21A in a state of being slidably moving in the extending direction of the downstream side main body part 23. The operation knob 60 is operated by a vehicle occupant when changing a direction of the air-conditioning air to be blown out from the air outlet 12. The operation knob 60 is rotatable around the rotation axis 24a of the downstream side fin 21A together with the downstream side fin 21A.

The air conditioning register 10 of the embodiment includes a transmission mechanism B1 that transmits displacement of the operation knob 60 to the upstream side fin 31A. That is, the transmission mechanism B1 transmits a slide operation of the operation knob 60 to the upstream side fin 31A, and rotates the upstream side fin 31A around the rotation axis 34a extending in the vehicle vertical direction Y.

As illustrated in FIG. 2, the transmission mechanism B1 includes a fork 70 connected to the operation knob 60. A pair of support shafts 71 are provided at a base end part of the fork 70. Both support shafts 71 are supported by the operation knob 60 in a rotatable state. That is, the base end part of the fork 70 is supported by the operation knob 60 in a rotatable state. Therefore, the fork 70 is rotatable with respect to the operation knob 60. However, when the fork 70 does not contact stoppers 41 and 42 which will be described later, an angle formed by the fork 70 and the operation knob 60 is maintained. A pair of transmission pieces 72, which are separated from each other in the vehicle width direction X, are provided closer to the tip side of the fork 70 than the both support shafts 71.

Figure 5B:
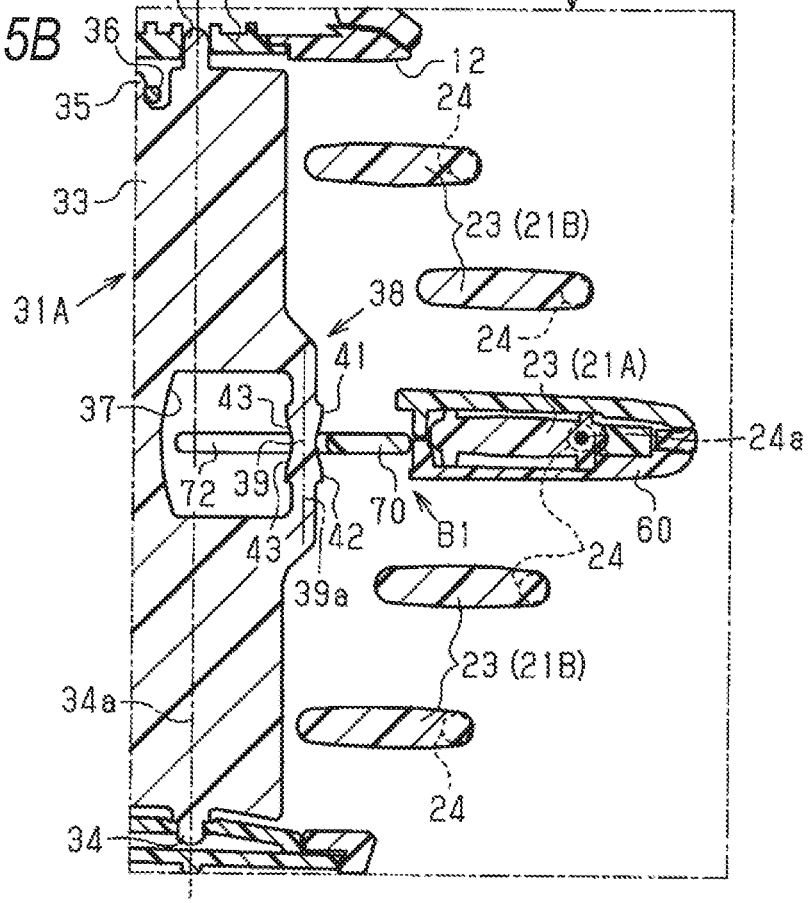
FIG. 5B is an enlarged view of a part of FIG. 5A.

As illustrated in FIGS. 3 and 5B, in the upstream side fin 31A, a cut-off part 37 is formed from its downstream end edge to the upstream in the flow direction A1 at a center portion of the vehicle vertical direction Y of the upstream side main body part 33. The cut-off part 37 is provided for avoiding interference between the fork 70 and the upstream side main body part 33 when the upstream side fin 31A is rotated.

A transmission shaft 38 extending in a predetermined direction is provided in the cut-off part 37. In the example illustrated in FIG. 3, the transmission shaft 38 is provided at a downstream end of the cut-off part 37. A center portion in an extending direction of the transmission shaft 38 is a cylindrical main body shaft part 39. The extending direction of the transmission shaft 38 is almost the same as an extending direction of the upstream side main body part 33, that is, intersects the vehicle width direction X.

Figure 4:
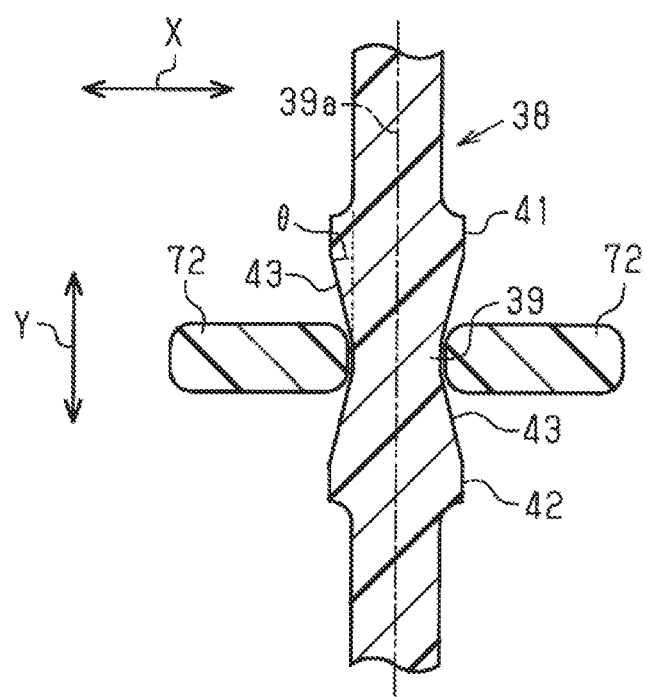
FIG. 4 is a cross-sectional view illustrating a positional relationship between a stopper of a transmission shaft and a pair of transmission pieces of a fork in the air conditioning register.

As illustrated in FIG. 4, the main body shaft part 39 of the transmission shaft 38 is interposed between the pair of transmission pieces 72 of the fork 70. A diameter of the main body shaft part 39 is set to be slightly smaller than a distance between the both transmission pieces 72. For example, while the distance between the both transmission pieces 72 is "3.02 cm", the diameter of the main body shaft part 39 is "3.00 cm".

As illustrated in FIGS. 3 and 4, the pair of stoppers 41 and 42 that are separated from each other in the extending direction of the transmission shaft 38 are provided in the transmission shaft 38. Specifically, both the stoppers 41 and 42 sandwich both the transmission pieces 72 from the vehicle vertical direction Y. Both the stoppers 41 and 42 approach both the transmission pieces 72. Both the stoppers 41 and 42 regulate further displacement of the fork 70 when at least one of the pair of transmission pieces 72 contacts the stoppers 41 and 42 by the displacement of the fork 70 caused by the rotation of the operation knob 60 and the downstream side fin 21A.

A surface in contact with the transmission piece 72 in both stoppers 41 and 42 is an inclined surface 43 that is inclined with respect to a center axis 39a of the main body shaft part 39. Diameters of both stoppers 41 and 42 gradually increase as the stoppers 41 and 42 approach the end of the transmission shaft 38. Accordingly, a center axis of both the stoppers 41 and 42 is disposed on an extension line of the center axis 39a of the main body shaft part 39.

In the embodiment, an inclination angle θ of the inclined surface 43 with respect to the center axis 39a of the main body shaft part 39 is equal to or greater than "9°" and equal to or less than "14°". For example, as illustrated in FIG. 4, both the stoppers 41 and 42 are formed so that the inclination angle θ becomes "14°".

Next, action and effect of the air conditioning register 10 of the embodiment will be described.

Figure 6A:
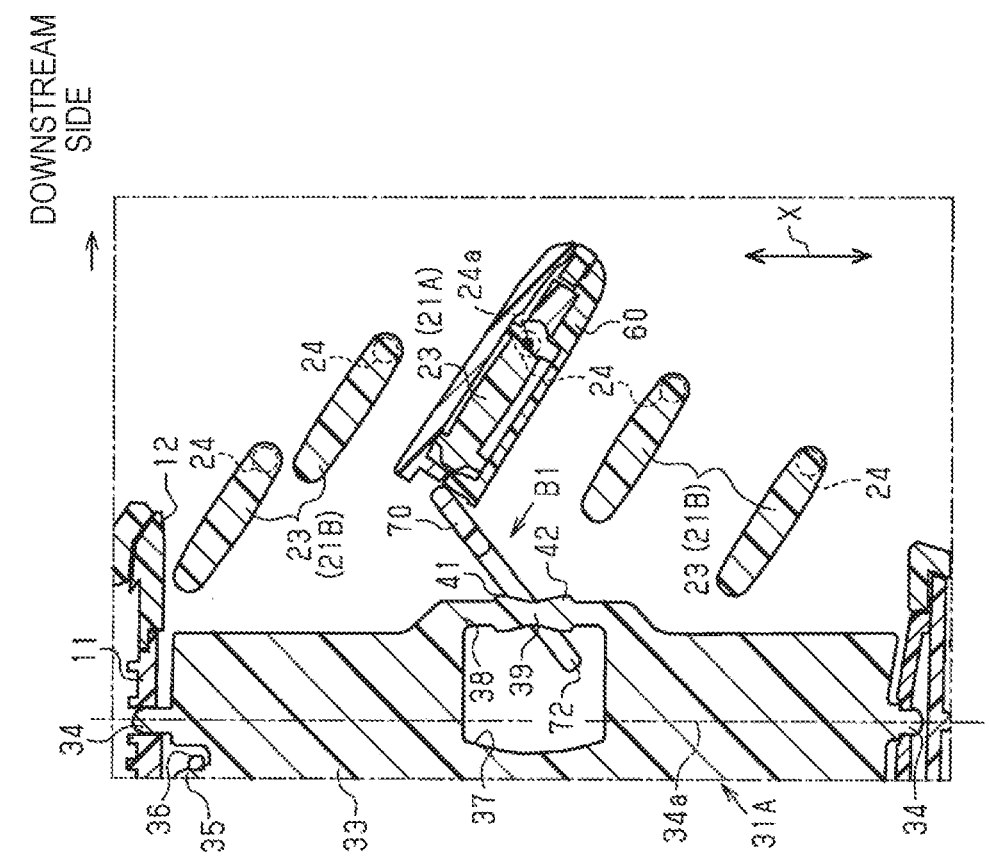
FIGS. 6A and 6B are end views illustrating an operation when an operation knob and a downstream side fin are rotated in the air conditioning register.

In the state illustrated in FIGS. 5A and 5B, the operation knob 60 is located at a center portion in a longitudinal direction of the downstream side main body part 23. From this state, the operation knob 60 is rotated around the rotation axis 24a extending in the vehicle width direction X by an operation of a vehicle occupant. For example, when the operation knob 60 is rotated in a counterclockwise direction as illustrated in FIG. 6A, the downstream side fin 21A that supports the operation knob 60 also rotates in the counterclockwise direction. At this time, the fork 70 connected to the operation knob 60 is displaced along the transmission shaft 38 while maintaining its posture. The above-described displacement of the fork 70 causes at least one of the pair of transmission pieces 72 of the fork 70 to contact the stopper 42 on the lower side in the drawing.

Figure 6B:
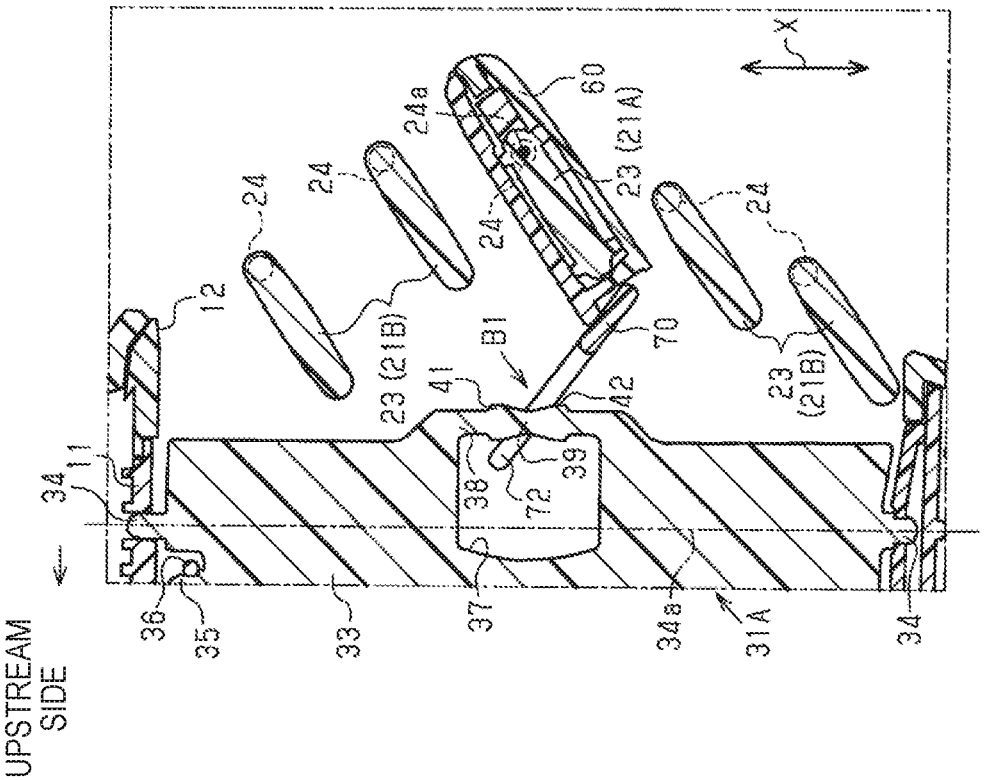

For example, when the operation knob 60 is rotated in a clockwise direction as illustrated in FIG. 6B, the downstream side fin 21A also rotates in the clockwise direction. At this time, the fork 70 connected to the operation knob 60 is displaced along the transmission shaft 38 while maintaining its posture. The displacement of the fork 70 causes at least one of the pair of transmission pieces 72 of the fork 70 to contact the stopper 41 on the upper side in the drawing.

When the operation of the operation knob 60 continues even after the transmission piece 72 contacts the stoppers 41 and 42, the fork 70 rotates around a contact place with the stoppers 41 and 42 as a fulcrum, and the angle formed by the fork 70 and the operation knob 60 changes. When the angle formed by the fork 70 and the operation knob 60 reaches a predetermined angle, further change in the angle formed by the fork 70 and the operation knob 60 is regulated, and as a result, further rotation of the operation knob 60 is regulated.

Figure 7:
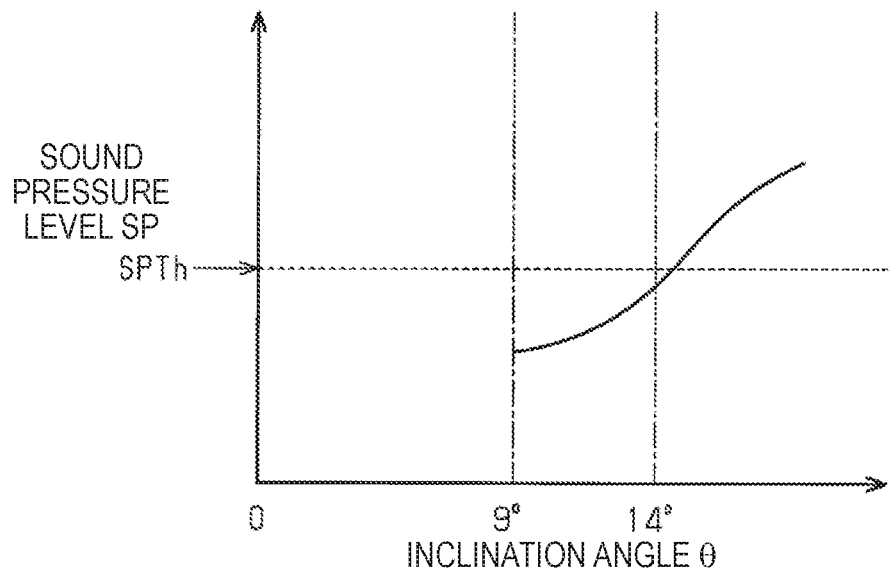
FIG. 7 is a graph illustrating a relationship between an inclination angle and a sound pressure level in the air conditioning register.

Here, when the transmission piece 72 contacts the stoppers 41 and 42 by the operation of the operation knob 60, an abnormal noise may be generated by the contact therebetween. FIG. 7 is a diagram illustrating a relationship between a sound pressure level SP, which is the magnitude of the abnormal noise, and an inclination angle θ of the inclined surface 43 of the stoppers 41 and 42. A broken line illustrated in FIG. 7 is a determination sound pressure level SPTh set as an upper limit of the sound pressure level at which the vehicle occupant does not feel uncomfortable. That is, when the sound pressure level SP exceeds the determination sound pressure level SPTh, the vehicle occupant may feel uncomfortable due to the abnormal noise generated when the transmission piece 72 contacts the stoppers 41 and 42.

As illustrated in FIG. 7, when the inclination angle θ is equal to or greater than "9°", as the inclination angle θ is smaller, the sound pressure level SP becomes lower. As the inclination angle θ is smaller, the transmission piece 72 is easy to be elastically deformed when the transmission piece 72 contacts the stoppers 41 and 42. That is, in the energy accumulated at the contact portion between the transmission piece 72 and the stoppers 41 and 42, the energy to be consumed by the elastic deformation of the transmission piece 72 is large. Therefore, as the inclination angle θ is smaller, the sound pressure level SP of the abnormal noise is hard to become large.

When the inclination angle θ is equal to or less than "14°", the sound pressure level SP does not exceed the determination sound pressure level SPTh. Therefore, as shown in the embodiment, the inclination angle θ is set to "14°", thereby making it possible to prevent the occupant from feeling uncomfortable due to the abnormal noise generated when the transmission piece 72 contacts the stoppers 41 and 42.

Second Embodiment

Next, a second embodiment of the air conditioning register will be described with reference to FIGS. 8 to 12. In the following description, portions that are different from those of the first embodiment will be mainly described, and the same or corresponding member configurations as those of the first embodiment will be denoted by the same reference signs, and the description thereof will be omitted.

Figure 8:
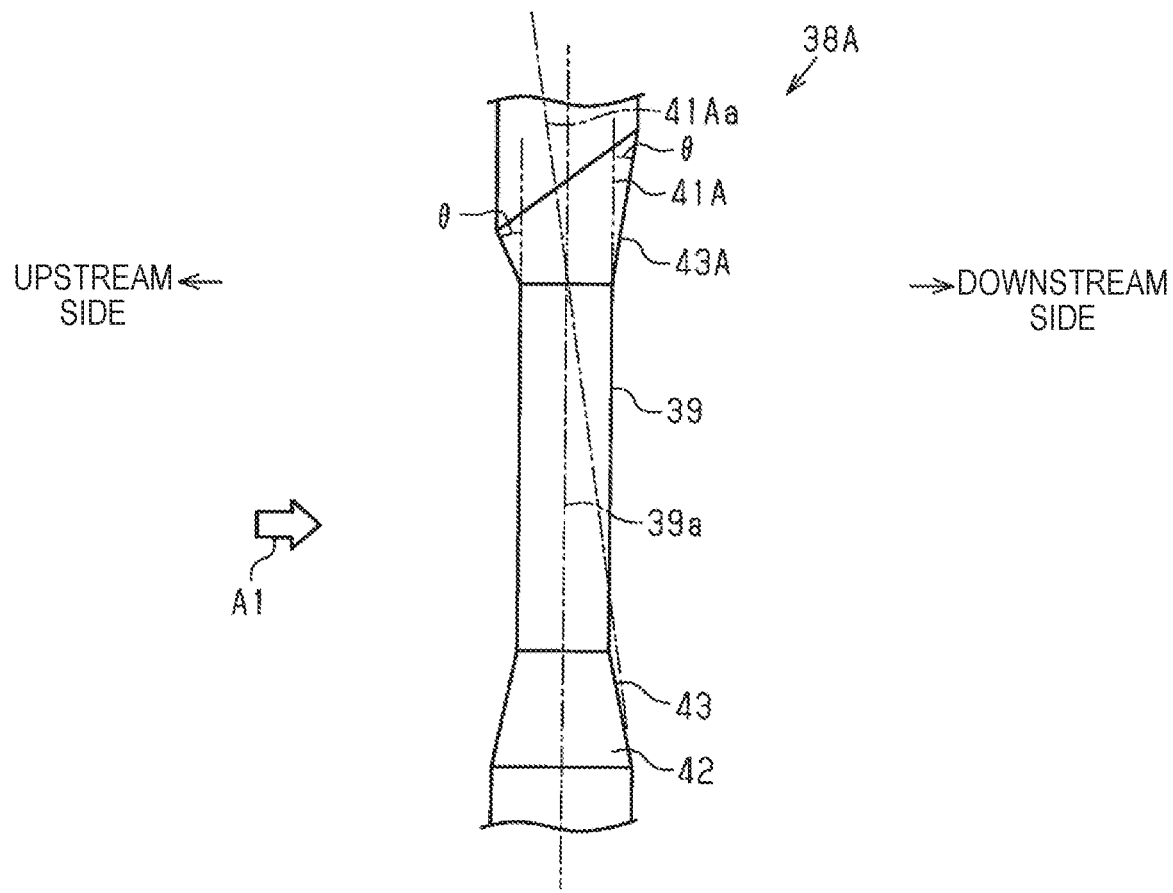
FIG. 8 is a diagram schematically illustrating a part of the transmission shaft in an air conditioning register of a second embodiment.

FIG. 8 illustrates a transmission shaft 38A provided in the upstream side fin 31A in the air conditioning register 10 of the embodiment. The transmission shaft 38A includes a main body shaft part 39 and a pair of stoppers 41A and 42. Of the pair of stoppers 41A and 42, a shape of the stopper 42 on the lower side in the drawing is the same as that described in the first embodiment. That is, the center axis of the stopper 42 is located on the extension line of the center axis 39a of the main body shaft part 39. On the other hand, a shape of the stopper 41A on the upper side in the drawing is different from that described in the first embodiment.

A center axis 41Aa of the stopper 41A is inclined with respect to the center axis 39a of the main body shaft part 39 which is also a center axis of the transmission shaft 38A. Specifically, the stopper 41A is configured so that a diameter centering on the center axis 41Aa thereof gradually increases as the stopper 41A is separated from the stopper 42. That is, the inclined surface 43A of the stopper 41A is inclined with respect to the center axis 39a of the main body shaft part 39. The center axis 41Aa of the stopper 41A is inclined with respect to the center axis 39a of the main body shaft part 39 so that an inclination angle θ of the inclined surface 43A at a portion on the upstream side in the flow direction A1 of the stopper 41A becomes greater than an inclination angle θ of the inclined surface 43A at a portion on the downstream side in the flow direction A1 of the stopper 41A.

Of the inclined surface 43A of the stopper 41A, a portion having the greatest inclination angle θ with respect to the center axis 39a of the main body shaft part 39 is defined as a maximum inclination portion, and a portion having the smallest inclination angle θ with respect to the center axis 39a of the main body shaft part 39 is defined as a minimum inclination portion. In this case, in the embodiment, the inclination angle θ of the maximum inclination portion is equal to or less than "14°", and the inclination angle θ of the minimum inclination portion is equal to or greater than "9°".

Next, an operation of the air conditioning register 10 of the embodiment will be described with reference to FIGS. 9 to 12.

Figure 9:
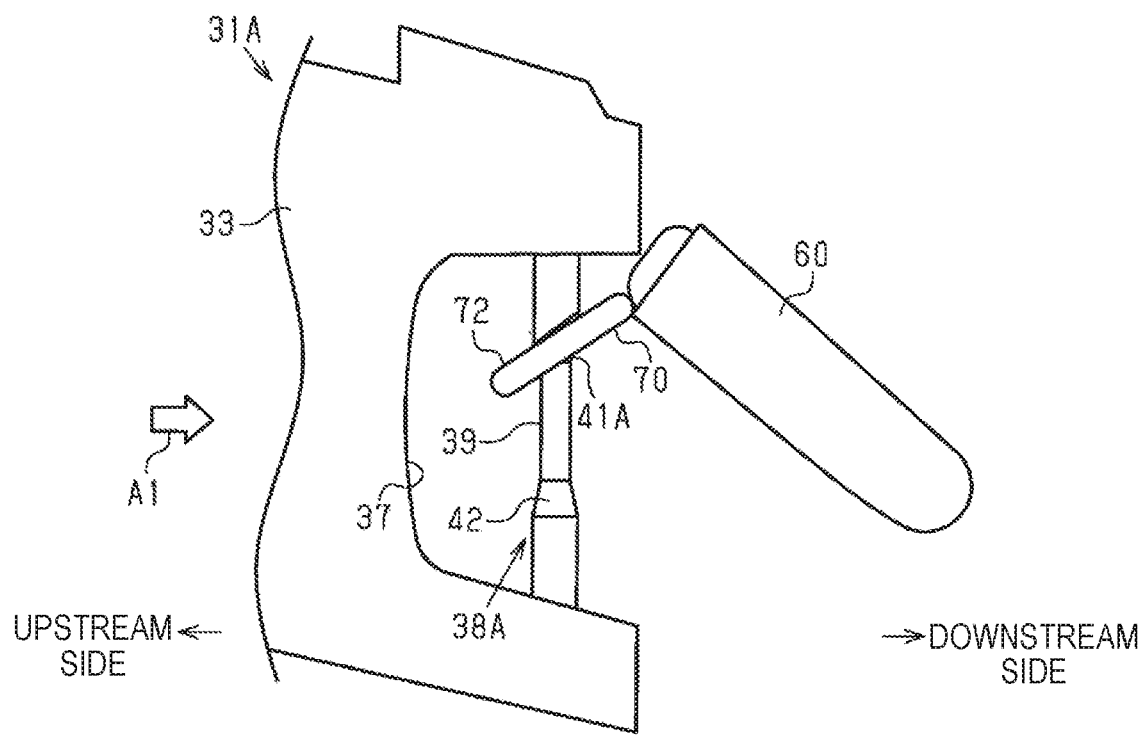
FIG. 9 is a schematic diagram illustrating a case in which the operation knob is operated in the air conditioning register
Figure 10:
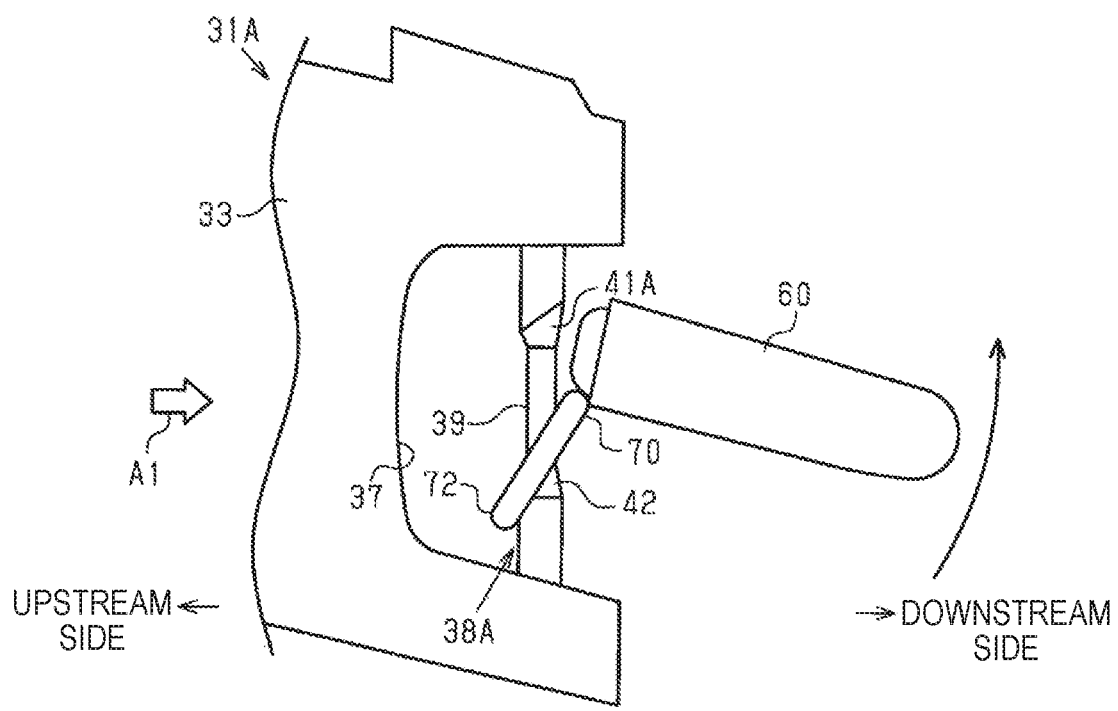
FIG. 10 is a schematic diagram illustrating a case in which the operation knob is operated in the air conditioning register.

FIG. 9 illustrates a state in which the transmission piece 72 of the fork 70 contacts a portion on the downstream side in the flow direction A1 of the stopper 41A on the upper side in the drawing. From this state, the operation knob 60 is rotated in a direction of separating the fork 70 from the stopper 41A by the operation of the vehicle occupant. At this time, the fork 70 is displaced along the main body shaft part 39 of the transmission shaft 38A while maintaining the angle formed by the fork 70 and the operation knob 60. Accordingly, as illustrated in FIG. 10, the transmission piece 72 of the fork 70 contacts the stopper 42 on the lower side in the drawing. Specifically, the transmission piece 72 contacts a portion on the upstream side in the flow direction A1 of the stopper 42. Even in this case, since the inclination angle θ of the inclined surface 43 at the portion where the transmission piece 72 is in contact therewith is equal to or less than "14°", it is possible to prevent the vehicle occupant from feeling uncomfortable due to the generation of abnormal noise caused by the contact therebetween.

Figure 11:
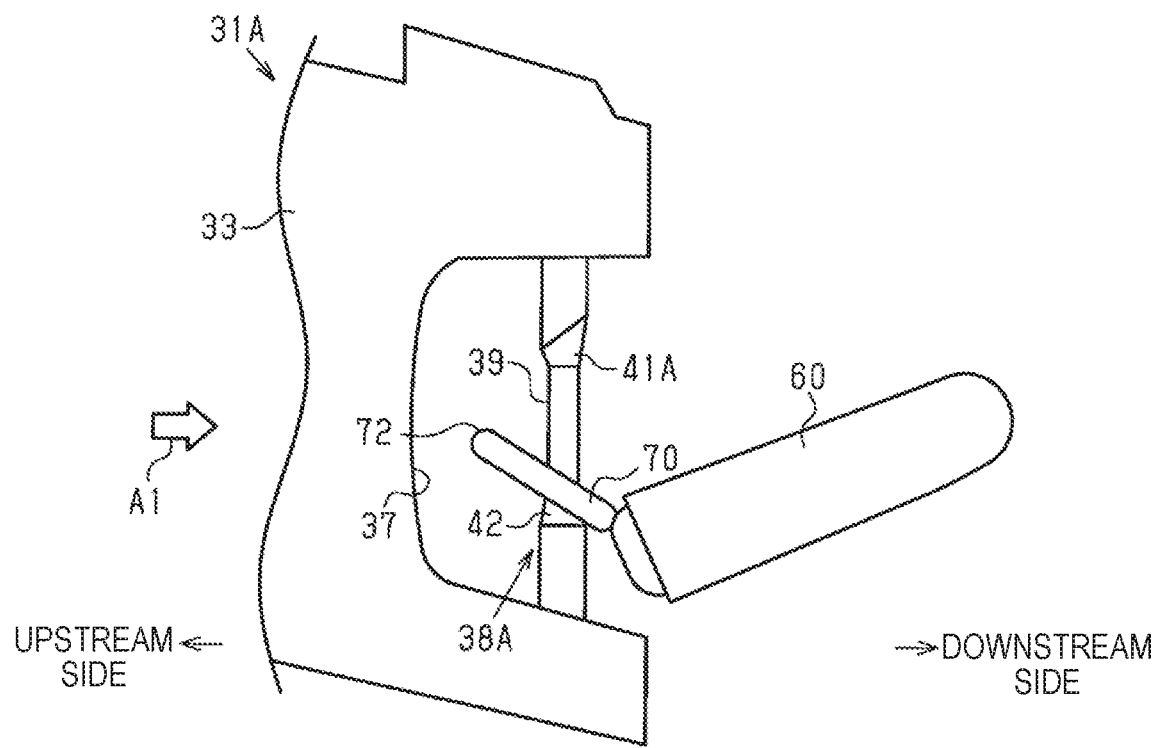
FIG. 11 is a schematic diagram illustrating a case in which the operation knob is operated in the air conditioning register.

In this state, the operation knob 60 is further rotated in the counterclockwise direction in the drawing by the operation of the occupant. Then, the angle formed by the fork 70 and the operation knob 60 gradually changes, and as illustrated in FIGS. 10 and 11, the contact portion between the stopper 42 and the transmission piece 72 is gradually displaced toward the downstream side in the flow direction A1. Then, when the angle formed by the fork 70 and the operation knob 60 reaches the predetermined angle, further change in the angle formed by the fork 70 and the operation knob 60 is regulated. As a result, the displacement of the fork 70 is regulated by the stopper 42, and thus, the further rotation in the counterclockwise direction of the operation knob 60 is regulated.

Figure 12:
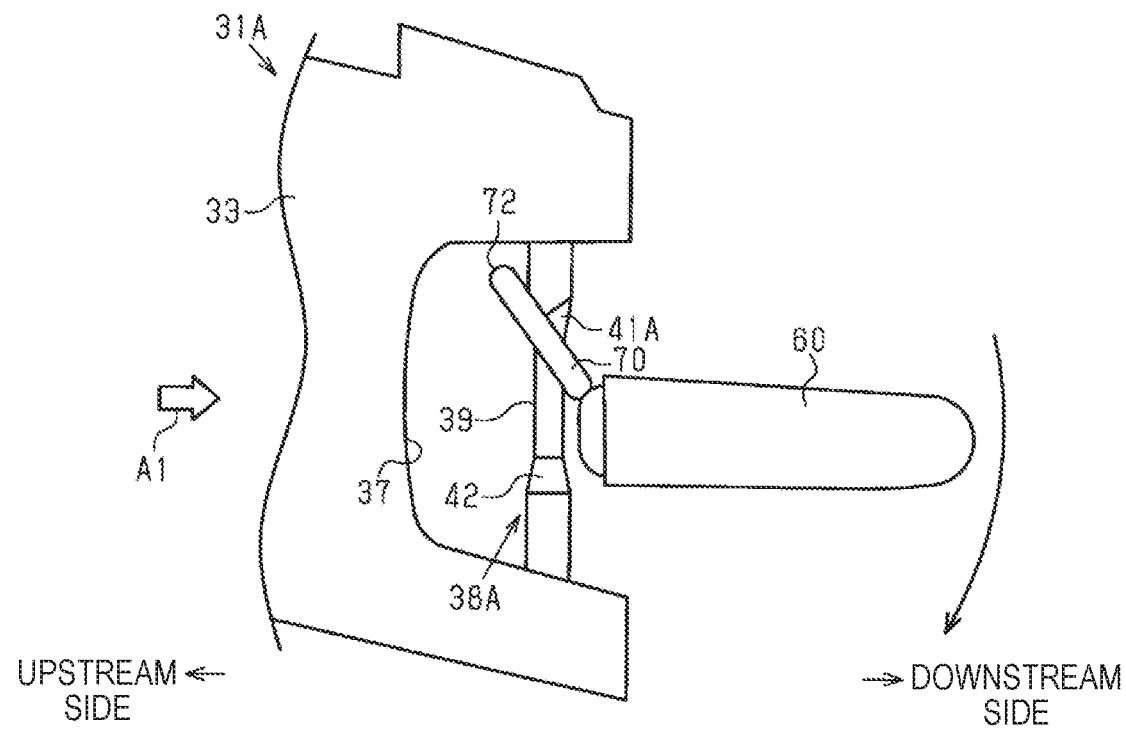
FIG. 12 is a schematic diagram illustrating a case in which the operation knob is operated in the air conditioning register.

When the operation knob 60 is rotated in a direction of separating the fork 70 from the stopper 42 by the operation of the occupant from the state illustrated in FIG. 11, the contact between the transmission piece 72 and the stopper 42 is released. At this time, the fork 70 is displaced along the main body shaft part 39 of the transmission shaft 38A in a state of maintaining the angle formed by the fork 70 and the operation knob 60. Next, as illustrated in FIG. 12, the transmission piece 72 of the fork 70 contacts the stopper 41A on the upper side in the drawing. Specifically, the transmission piece 72 contacts a portion on the upstream side in the flow direction A1 of the stopper 41A. Even in this case, since the inclination angle θ of the inclined surface 43A at the portion where the transmission piece 72 is in contact therewith is equal to or less than "14°", it is possible to prevent the vehicle occupant from feeling uncomfortable due to the generation of abnormal noise caused by the contact therebetween.

In this state, the operation knob 60 is further rotated in the clockwise direction in the drawing by the operation of the occupant. Next, the angle formed by the fork 70 and the operation knob 60 gradually changes, and as illustrated in FIGS. 9 and 12, the contact portion between the stopper 41A and the transmission piece 72 is gradually displaced toward the downstream side in the flow direction A1. Next, when the angle formed by the fork 70 and the operation knob 60 reaches the predetermined angle, further change in the angle formed by the fork 70 and the operation knob 60 is regulated. As a result, the displacement of the fork 70 is regulated by the stopper 41A, and thus, the rotation in the clockwise direction of the operation knob 60 is regulated.

In the embodiment, effects described below can be further obtained.

When the state illustrated in FIG. 11 shifts to the state illustrated in FIG. 12 by the operation of the operation knob 60 by the vehicle occupant, tips of the pair of transmission pieces 72 are displaced to the downstream side in the flow direction A1 by the displacement of the fork 70. When a length of the pair of transmission pieces 72 is short, at this time, the transmission shaft 38A may be detached to the outside from a space between the tips of the pair of transmission pieces 72.

In this point, in the embodiment, the center axis 41Aa of the stopper 41A is inclined with respect to the center axis of the transmission shaft 38A as described above. Accordingly, the inclination angle θ of the inclined surface 43A at the portion on the upstream side in the flow direction A1 of the stopper 41A can be greater than the inclination angle θ of the inclined surface 43A at the portion on the downstream side in the flow direction A1 thereof. That is, the inclined surface 43A at the portion on the upstream side in the flow direction A1 can be disposed closer to the center side in the extending direction of the transmission shaft 38A than the inclined surface 43A at the portion on the downstream side in the flow direction A1. As a result, when the pair of transmission pieces 72 are caused to approach the stopper 41A by the movement of the operation knob 60, the transmission piece 72 can be caused to contact the stopper 41A before the transmission shaft 38A is detached from the space between the pair of transmission pieces 72. That is, it is possible to prevent the transmission shaft 38A from being detached from the space between the pair of transmission pieces 72.

Modification

The above-described respective embodiments can be modified and implemented as follows. The respective embodiments and the following modifications can be implemented in combination with each other within a range that is not technically inconsistent.

In the second embodiment, the stopper located on the lower side in FIG. 8 may have a shape so that the center axis thereof is inclined with respect to the center axis 39a of the main body shaft part 39.

In the second embodiment, the stopper located on the upper side in FIG. 8 may have a shape so that the center axis thereof is not inclined with respect to the center axis 39a of the main body shaft part 39.

In the first embodiment, the inclination angle θ of the inclined surface 43 of the stoppers 41 and 42 may be different from the angle "14°" as long as the inclination angle θ thereof is in a range of being equal to or greater than "9°" and being equal to or less than "14°".

In the first embodiment, the fork 70 may be connected to the operation knob 60 in a non-rotatable state.

The downstream side fins 21 and 21B may extend in a direction different from the vehicle width direction X as long as the downstream side fins 21 and 21B extend in a direction intersecting the flow direction A1. For example, the downstream side fins 21 and 21B may extend in the vehicle vertical direction Y. In this case, the upstream side fins 31A and 31B extend in a direction intersecting both the flow direction A1 and the vehicle vertical direction Y, for example, in the vehicle width direction X. According to the above-described configuration, the vehicle vertical direction Y corresponds to the "first direction" and the vehicle width direction X corresponds to the "second direction".

The air conditioning register may be incorporated in a place different from the instrument panel in the vehicle compartment.

The air conditioning register may be applied to an air conditioner that is not mounted on a vehicle.

What is claimed is:

1. An air conditioning register comprising:
a downstream side fin that extends in a first direction which is a direction intersecting a flow direction of air-conditioning air and that is configured to be rotatable around an axis extending in the first direction;
an upstream side fin that is disposed upstream of the downstream side fin in the flow direction and that extends in a second direction which is a direction intersecting both the flow direction and the first direction;
an operation knob supported by the downstream side fin so as to rotate together with the downstream side fin; and
a fork that includes a pair of transmission pieces separated from each other in the first direction, and that is connected to the operation knob, wherein:
a transmission shaft extending in a direction intersecting the first direction is provided in the upstream side fin, and the transmission shaft is interposed between the pair of transmission pieces in the first direction;
the transmission shaft is provided with a stopper that regulates further displacement of the fork, when at least one of the pair of transmission pieces contacts the stopper by the displacement of the fork caused by the rotation of the operation knob and the downstream side fin;
a surface of the stopper contacting the transmission piece is an inclined surface that is inclined with respect to a center axis of the transmission shaft so as to be located outside in a radial direction centering on the center axis of the transmission shaft as approaching an end of the transmission shaft;
an inclination angle of the inclined surface with respect to the center axis of the transmission shaft is an angle equal to or greater than 9° and equal to or less than 14°; and
a center axis of the stopper is inclined with respect to the center axis of the transmission shaft so that an inclination angle of the inclined surface at a portion on the upstream side in the flow direction of the stopper is greater than an inclination angle of the inclined surface at a portion on the downstream side in the flow direction of the stopper.

2. The air conditioning register according to claim 1, wherein
the stopper is configured so that a diameter thereof gradually increases as the stopper approaches the end of the transmission shaft.

3. The air conditioning register according to claim 1, wherein:
a base end of the fork is supported in a rotatable state with respect to the operation knob;
when the fork does not contact the stopper, the fork is displaced in a state where an angle formed by the operation knob and the fork is maintained when the operation knob is rotated;
when the fork approaches the stopper and the transmission piece contacts the portion on the upstream side in the flow direction of the stopper, the angle formed by the operation knob and the fork is changed by further rotation of the operation knob, and a contact portion between the stopper and the transmission piece is displaced to the downstream side in the flow direction; and
when the transmission piece contacts the portion on the upstream side in the flow direction of the stopper and the displacement of the fork is regulated by the stopper, the further rotation of the operation knob is regulated.

* * * * *